United States Patent

Matsuyama et al.

Patent Number: 5,803,663
Date of Patent: Sep. 8, 1998

[54] MERCURY-REMOVAL METHOD

[75] Inventors: Akito Matsuyama; Kanji Higaki; Hiroe Hayasaka, all of Tokyo, Japan

[73] Assignee: Taisei Corporation, Tokyo, Japan

[21] Appl. No.: 672,715

[22] Filed: Jun. 28, 1996

[30] Foreign Application Priority Data

Jul. 18, 1995 [JP] Japan .................................. 7-203805

[51] Int. Cl.$^6$ ........................................................ B09C 1/06
[52] U.S. Cl. ........................... 405/128; 588/234; 588/249; 588/900
[58] Field of Search ........................ 405/128; 588/234, 588/900, 249; 266/148, 149

[56] References Cited

U.S. PATENT DOCUMENTS

| | | | |
|---|---|---|---|
| 4,087,276 | 5/1978 | Generini | 210/766 X |
| 4,344,793 | 8/1982 | Burkett et al. | 588/234 |
| 5,245,120 | 9/1993 | Srinivasachar et al. | 588/256 |
| 5,264,654 | 11/1993 | Kreft et al. | 588/234 X |
| 5,300,137 | 4/1994 | Weyand et al. | 405/128 X |
| 5,517,004 | 5/1996 | Blonk | 588/234 X |
| 5,569,154 | 10/1996 | Navetta | 405/128 X |

FOREIGN PATENT DOCUMENTS

| | | |
|---|---|---|
| 42 43 313 | 6/1994 | Germany . |
| WO 94/06946 | 3/1994 | WIPO . |

OTHER PUBLICATIONS

A. Roca, et al.; "Study of Chloridizing Volatilization Roasting of Cinnabar as a Basis for a Process to Obtain Mercuric and Mercurous Chlorides"; Apr. 1990; vol. 21B; pp. 259–268.

*Primary Examiner*—George A. Suchfield
*Attorney, Agent, or Firm*—Nikaido Marmelstein Murray & Oram LLP

[57] ABSTRACT

A method of removing one or more mercury compounds from mercury-contaminated soil is disclosed. The method includes mixing the mercury-contaminated soil with an additive, and heating the thus produced mixture to a temperature which is below the boiling point of the one or more mercury compounds. The one or more mercury compounds are thereafter recovered from the soil. Preferably, the additive is a chloride compound of iron or nickel.

13 Claims, 5 Drawing Sheets

PROPORTION OF STANDARD SAND TO LOAM/SLUDGE (ADDITIVE AMOUNT = 0.02 MOLE)

AMOUNT OF STANDARD SAND (g)/5g OF MINAMATA BAY SLUDGE (WET)

MERCURY-REMOVAL METHOD

FIELD OF THE INVENTION

This invention relates to the removal of harmful metals, especially mercury, from soil.

Mercury-contaminated soil is extremely toxic, and mercury pollution is strictly regulated. Yet no economical method exists that will reliably clean up contaminated soil by methods other than insolubilizing the mercury.

Conventional methods to remove mercury or mercury compounds from soil include mixing and dispersing the soil in a solution of sodium sulfide to convert mercury in the soil to insoluble mercuric sulfide, or flushing with water, or heating at high temperatures in a kiln.

In additional conventional methods, treatment of mercury-contaminated soil is broadly of two types:

(1) to enclose and seal the site of the contamination with water-impermeable sheet plastic or sheet piling and bentonite; or (2) if the soil is highly contaminated and is to be excavated, the soil is mixed and dispersed in a solution of sodium sulfide, then buried inside a covered concrete-lined pit.

The conventional methods outlined above present the following problems. First, either method involves insolubilization of the mercury and sealing of the mercury-contaminated soil, which cannot solve a fundamental problem. Second, enclosing and sealing the site of contamination with water-impermeable sheet plastic or other material requires a large amount of human intervention.

If the contaminated soil is excavated, the land can be used, but a separate pit to store the contaminated soil is then required. Human labor is required not only to excavate and move the contaminated soil, but also to manage the pit once it is created.

Flushing mercury-contaminated soil with water presents problems in that this procedure requires copious amounts of water. Once the mercury is flushed, the mercury must be removed from the water. This additional step is costly and laborious.

Mercury compounds boil at approximately 550° C. Hence, conventional kiln treatment requires heating the mercury-contaminated soil between 500°–1,000° C. This is so expensive, and complex and large facilities must be constructed.

SUMMARY OF THE INVENTION

The object of this invention is to facilitate the removal of mercury from mercury-contaminated soil, wherein the problems outlined above which are associated with conventional methods are reduced or eliminated.

The object is achieved by using a method to remove the mercury from the soil containing mercury compounds, in which the soil is mixed with an additive, preferably a metal compound, and the mixture so obtained is heated to a temperature lower than the boiling point of the applicable mercury compound. Alternatively, the soil is mixed with a silica mineral and an additive, preferably a metal compound, and the mixture so obtained is heated to a temperature lower than the boiling point of the applicable mercury compound, thereby separating the mercury from the soil.

The separated mercury is then recovered, thereby completing the removal of the mercury from the soil.

DESCRIPTION OF THE PREFERRED EMBODIMENTS

Figure 1:
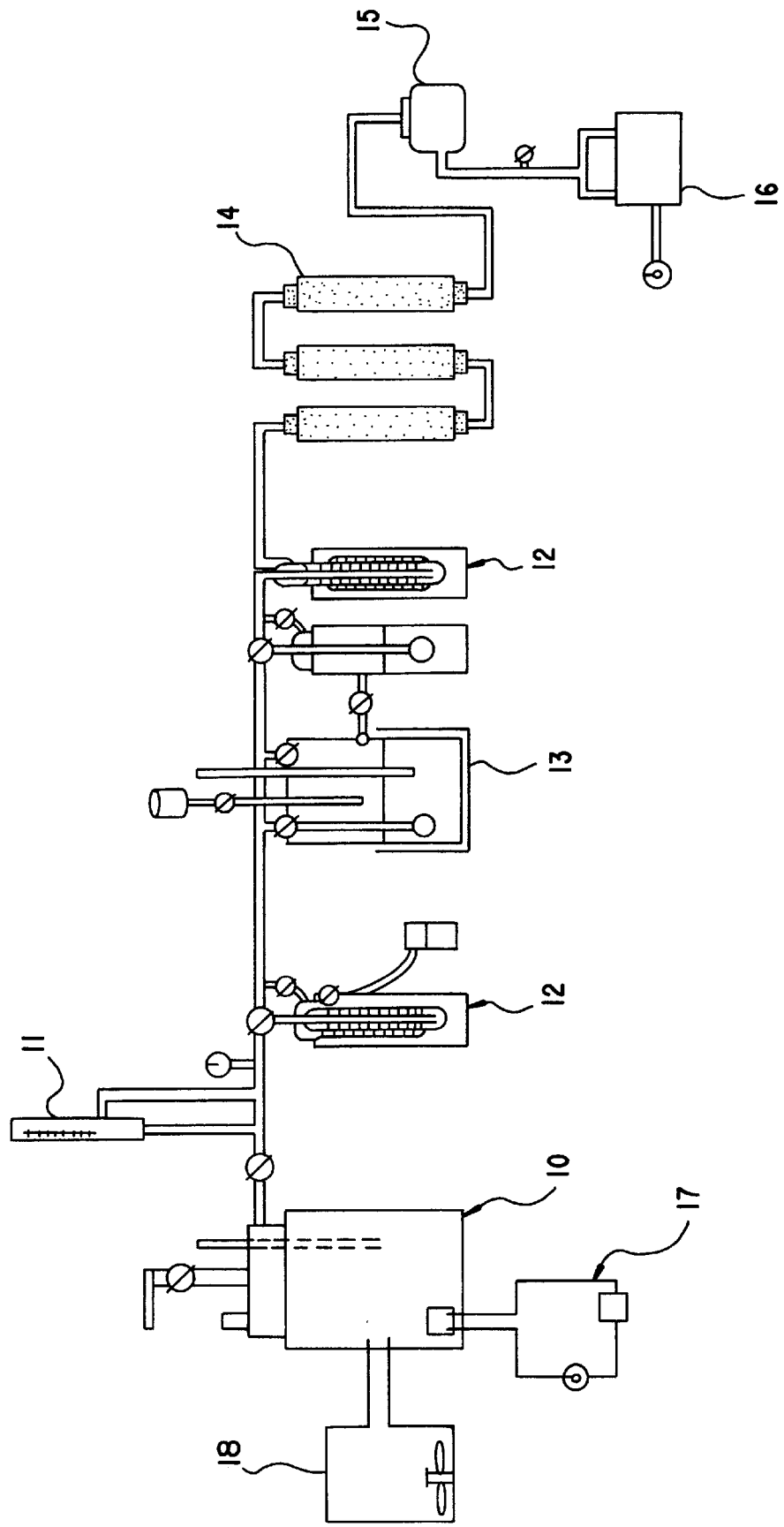
FIG. 1 is an overview of the experimental equipment for heating mercury-contaminated soil.

Embodiments of this invention are explained below.

Soil contaminated with mercuric sulfide of other mercury compounds is mixed with an additive, then the mixture is heated to a temperature lower than the boiling point of the mercury compound, for example to 200°–300° C. This will reduce the mercury content in the soil.

Advantageously, if the contaminated soil contains no silica ($SiO_2$), or silica in only very small amounts, then the soil can also be mixed with silica minerals or other forms of silica before heat treatment.

Transition metals, magnesium, calcium, zinc, aluminum or respective compounds thereof can be used as the additive. Iron, nickel, or manganese are the preferable transition metals, with iron being the most preferable.

Chlorides are the preferable compounds of the transition metals, magnesium, zinc or aluminum. The chlorides of iron or nickel, specifically. ferrous chloride ($FeCl_2$), ferric chloride ($FeCl_3$), or nickel chloride ($NiCl_2$) are most preferable.

Should the contaminated soil naturally contain an adequate amount of the active components of an additive, then the addition of further additive is not required.

Soil is comprised of many substances, of which silica is typical. If the soil is primarily composed of sludge or other organic substances, or if it does not contain adequate amounts of silica, then the contaminated soil may advantageously be mixed with soil containing silica minerals or other sources of silica, or a silica source itself can be added to the soil.

Standard sand, silica sand, or similar type of soil can be used as the silica-containing source. Reducing the particle diameter of this sand would advantageously increase the reaction surface area for better reaction efficiency. Also, the inventors have found that crystalline silica is more efficient than other sources of silica, for which quartz, chert, or orthoclase is preferable.

For heat-treatment of the soil, the perimeter of the contaminated soil is structurally enclosed to create a more airtight environment than that which occurs naturally. Next, using, for example, a back hoe or other construction equipment, the contaminated soil is excavated. The excavated soil is placed into a rotary kiln or other furnace, and heated to a temperature lower than the boiling point of the mercury compound to be removed, for example, 200°–300° C. Preferred heating time is 2 hours.

In doing so, the furnace is maintained at a partial pressure (i.e., lower than atmospheric pressure) to promote the evaporation of mercury, while taking precautions that mercury vapors so produced will not leak out of the kiln.

If a rotary kiln is being used, one method of mixing in the additive into the contaminated soil is to place the additive into the kiln simultaneously with these soil, then stirring, mixing, and heating. Stirring can be performed by stirring blades pre-set inside the rotary kiln for continuous stirring during heating. This will ensure adequate reaction of the contaminated soil with the additive.

Vaporized mercury is dangerous because its airborne absorption ratio into human tissue is very high. Therefore, ideally, all vaporized mercury must be collected without any leakage outside of the system.

One method for collecting the mercury vapors is to flash cool the vapors and collect the condensate. Vapors that do not condense are passed through a sulfuric acid solution containing potassium permanganate which will decompose and oxidize the mercury. Any mercury vapors still not collected can be adsorbed by activated carbon designed specifically for mercury.

This invention is effective as follows, compared to conventional mercury-removal methods.

(1) In removing mercury from soil contaminated with mercury compounds, whereas conventionally the soil had to be treated from 500°–1,000° C., by this invention it need only be heated to a temperature which is below the boiling point of the mercury compound, preferably between 200°–300° C.

(2) By heating at a lower temperature than conventional methods, only small amounts of other harmful substances are released, in which case the equipment useful for conducting the method in accordance with the invention can be relatively simple and of smaller scale than conventional models.

(3) By heating at a lower temperature than conventional methods, very little of the mercury-contaminated soil itself is modified; hence, the soil can be re-utilized almost immediately as biologically active soil.

(4) By using the method in accordance with the present invention, mercury and compounds thereof, including stable mercuric sulfide which is normally difficult to remove, is removed and recovered from contaminated soil. The soil is therefore returned to its pre-contaminated state, and can be re-utilized.

The invention is elucidated further by the examples given below, which are not intended as a limitation on the invention as claimed.

EXAMPLE 1

Equipment and Conditions (FIG. 1)
Explanation of FIG. 1
Mixing Means 18

A conventional mixing device, such as one utilizing stirring blades, can be used as a mixing means. It can be pre-set inside the heat reaction vessel 10 or separately provided outside the heat reaction vessel as mixing means 18, as shown.

Heat Reaction Vessel 10

The heat reaction vessel 10 is to uniformly heat the soil to increase the temperature up to the pre-fixed level.

Slide-Back Voltage Regulator 17

The slide-back voltage regulator 17 is freely able to change voltage to control the temperature increase in the heat reaction vessel.

Flow Meter 11

The flow meter 11 is to precisely show the air flow amount in the device. Since air flow in the device greatly affects the purification of the contaminated soil by the heat-treatment, regulating the air flow amount is important.

Mercury Vapor Scrubber 12/Collecting Means

Heat-treated exhaust gas from the heat reaction vessel 10, is cooled in the mercury vapor scrubber 12. The mercury has a high vapor pressure and causes a large vapor pressure difference when flashed cool, thereby condensing the mercury.

Absorption Reactor 13/Collecting Means

Vapors that do not condense pass through a sulfuric acid solution of potassium permanganate in the absorption reactor 13, which decomposes and oxidizes the mercury.

Mercury Vapor Scrubber 12/Collecting Means

Flowing the air to the absorption reactor 13 blows a sulfuric acid mist from a sulfuric acid solution of potassium permanganate. The mist, if flown into the activated carbon adsorption column 14, prevents the effective absorption of the activated carbon adsorption column 14. Thus, to avoid the above-situation, this second mercury vapor scrubber 12 just like the first one flashes cool the vapors and collects the mist.

Activated Carbon Adsorption Column 14/Collecting Means

Most of the mercury is removed prior to this process. This activated carbon adsorption column 14 is provided to make sure that any remaining mercury vapors are collected in this device.

Vacuum Vessel 15

The vacuum vessel 15 regulates the rapid pressure change possibly caused by the act of turning on the aspirator 16.

Aspirator 16

Aspirator 16 is provided to set the pressure by absorbing the air.

Equipment for the experiments included a heat reaction vessel 10 in which to heat the contaminated soil, a flow meter 11, and multi-stage collection equipment for total collection of the mercury vaporized from the soil, including a mercury vapor scrubber 12, an absorption reactor 13, an activated carbon adsorption column 14, a vacuum vessel 15, and an aspirator 16.

Contaminated soil was placed into a porcelain crucible, and the crucible and its contents were placed into the heat reaction vessel 10. Then a voltage was applied with a slide-back voltage regulator 17 to maintain the vessel at the required temperature.

The heat reaction vessel was set at a pressure between 99–96 kPa (740–720 mm Hg), the heating temperature was set at 200° C.±20° C., the reaction time was 2 hours, and the gas flow inside the vessel was set to between 400–500 ml.

Mercury vapors released from the soil were cooled to 2°–3° C. in the mercury vapor scrubber 12. Virtually all of the vaporized mercury was collected in units 12, 13 and 14.

For monitoring these experiments, soil samples taken before and after heating were decomposed by the Akagi wet soil method using a mixture of perchloric acid, nitric acid and sulfuric acid. After decomposition, the samples were appropriately diluted, and total mercury content was analyzed by flameless atomic absorption spectrophotometry.

Soil Specimens

Standard sand (Toyoura Standard), loam soil (volcanic clay), and Minamata Bay mercury-contaminated soil (actual measured value of 90 ppm in moist soil; equivalent to 0.45 mg of mercury per 5 g of soil) were used as soil specimens.

The loam soil was air-dried loam which was ground to a uniform particle size of 1–2 mm diameter by a conventional grinding method. Properties of these soil specimens are delineated in Table 1 and Table 2.

α-HgS (mercuric sulfide) (manufactured by Kanto Chemical) was used as the mercury source for addition to the soil. Mercuric sulfide is the most stable of all mercury compounds, thus if mercury can be isolated and removed from mercuric sulfide, it should be possible to isolate and remove mercury from other compounds.

TABLE 1

Properties of Soil Specimens (1)

(%)

| | Na | Mg | Al | Si | S | K | Ca | Ti | V |
|---|---|---|---|---|---|---|---|---|---|
| Standard sand | 0.966 | — | 4.165 | 79.91 | — | 6.34 | — | 0.51 | — |
| Loam | — | 4.04 | 27.20 | 33.06 | 0.38 | 1.12 | 0.65 | 2.76 | 0.16 |
| Sludge | 2.93 | 11.58 | 16.73 | 17.15 | 2.37 | 2.00 | 25.75 | 0.50 | — |

TABLE 2

Properties of Soil Specimens (2)

(%)

| | Mn | Fe | Cl | Zn | Br | Hg | Ru | Moisture Content |
|---|---|---|---|---|---|---|---|---|
| Standard sand | | 1.58 | — | — | — | — | 6.53 | 0.12 |
| Loam** | 0.51 | 30.12 | — | — | — | — | — | 12.0 |
| Sludge | 0.85 | 5.75 | 14.12 | 0.11 | 0.09 | 0.07 | — | 130.0 |

**Air-dried

EXAMPLE 2

Next, the heat-treatment experiment (Experiment 1) using each type of additive is explained.

Types of Additives

Each additive was added to standard sand with a mercury content of 20 mg Hg per 10 g of soil. The additives were: sodium chloride (NaCl), magnesium chloride ($MgCl_2$), potassium chloride (KCl), calcium chloride ($CaCl_2$), calcium oxide (CaO), manganese carbonate ($MnCO_3$), manganous chloride ($MnCl_2$), manganese dioxide ($MnO_2$), manganous sulfate ($MnSO_4$), iron (Fe), ferric oxide ($Fe_2O_3$), ferroferric oxide ($Fe_3O_4$), ferrous chloride ($FeCl_2$), ferric chloride ($FeCl_3$), ferrous sulfate ($FeSO_4$), Mohr's salt (ferrous ammonium sulfate: $Fe(SO_4).(NH_4)_2SO_4$), ferrous hydroxide (FeO(OH), ferrocene (($C_5H_5)_2Fe$: dicyclopentadienyliron), nickel chloride ($NiCl_2$), nickel oxide (NiO), zinc chloride ($ZnCl_2$), aluminum chloride, anhydrous ($AlCl_3$), alumina trihydrate ($Al(OH)_3$), and aluminum oxide ($Al_2O_3$).

The additive concentration was 0.01 mole of the elemental metal in each compound, measured in grams. For example, NaCl has a molecular weight of 58.5, hence 0.59 g of sodium chloride was used. Similarly, 0.95 g of magnesium chloride (M.W.=95.22), 0.56 g of iron (atomic weight=55.85), 0.8 g ferric oxide (M.W.=160), 3.92 g of Mohr's salt (M.W.=392.14), or 2.44 g of ferrocene (M.W.= 243.6) was used.

Results of Experiment 1

Figure 2:
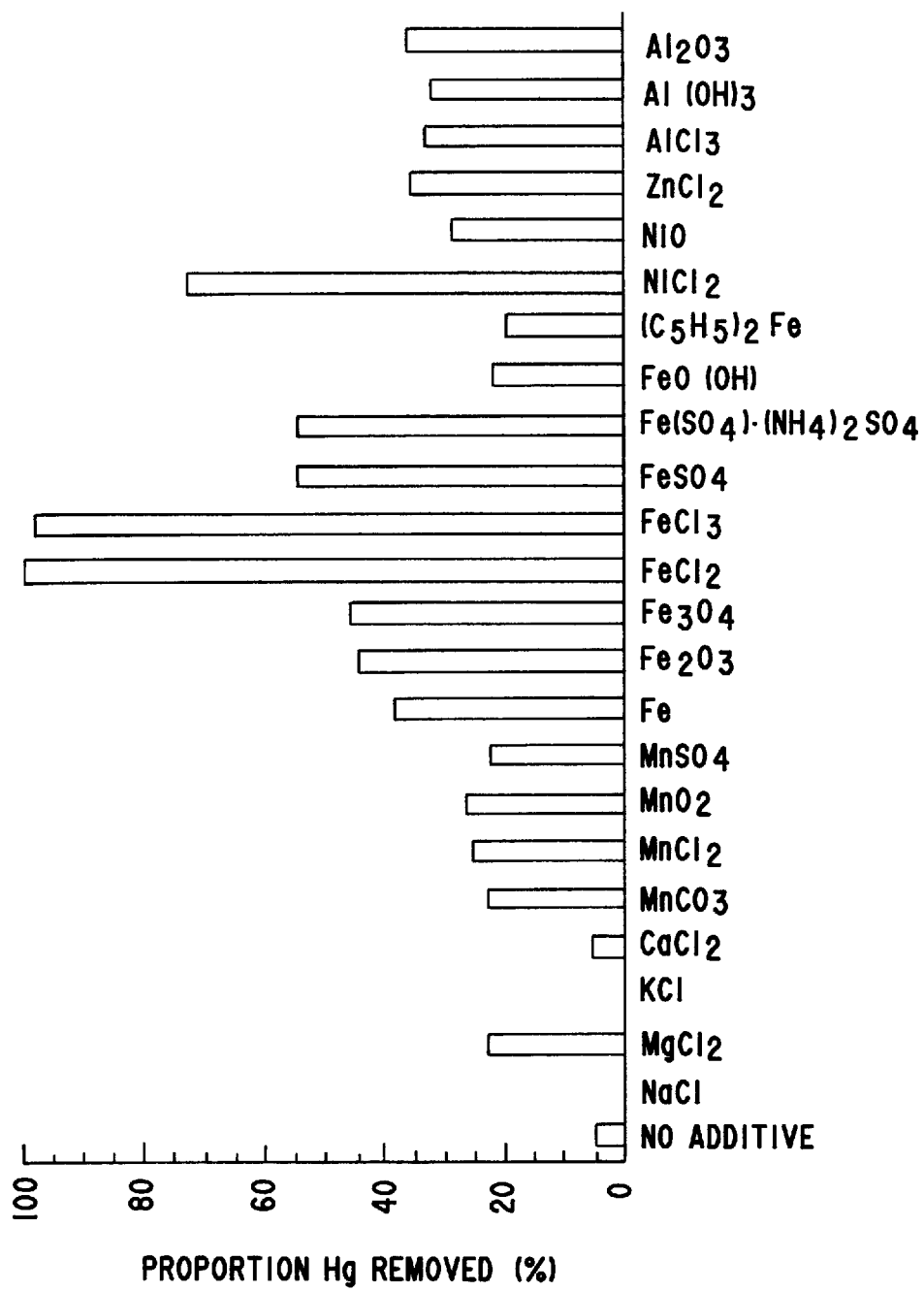
FIG. 2 illustrates the removal ratio of mercury by type of additive.

The effectiveness of each additive in removing mercuric sulfide from the test specimens is shown in FIG. 2.

This experiment showed that, in comparison to control samples without the addition of additives, transition metals and the typical elemental metals of magnesium, zinc, and aluminum were effective, but overall., the transition elements were more effective, particularly iron and nickel, of which the chloride salts were most effective. Ferrous chloride ($FeCl_2$) and ferric chloride ($FeCl_3$) were extremely effective additives, with the initial mercury concentration of 20 mg Hg/10 g of sample being reduced to 0.1 mg or less when heated at 200° C. for 2 hours, for an effective removal of mercuric sulfide of 99.7 and 99.0%, respectively. Nickel chloride ($NiCl_2$) also removed 72% of mercuric sulfide.

EXAMPLE 3

Heat treatment of simple mixture of ferrous chloride and mercuric sulfide (Experiment 2)

In Experiment 2, ferrous chloride, as an additive, and mercuric sulfide were mixed without the addition of soil. The amount of additive was the same as in Experiment 1 at 0.01 mole (g), and the initial amount of mercuric sulfide was 20 mg (or 17.4 mg of mercury).

After heating at 200° C. for 2 hours, the mercury content was still 16.9%. This indicates that mercuric sulfide could not be removed effectively with the addition of an additive only. In using ferrous chloride as the additive, chlorine gas is generated, and the iron is oxidized.

EXAMPLE 4

Heat-treatment experiment with addition of hydrochloric acid to standard sand (Experiment 3)

In Experiment 3, the removal of mercuric sulfide was determined for two samples. Sample (a) comprised 10 g of standard sand mixed with 20 mg of mercuric sulfide, and sample (b) comprised 10 g of standard sand de-ironized with heat-concentrated hydrochloric acid mixed with 20 mg of mercuric sulfide. The percentage of metals released from standard sand with heat-concentrated hydrochloric acid is shown in Table 3.

TABLE 3

Amount of elemental metals dissolved from sand (%)

| | Initial Value | Amount Released | % Released |
|---|---|---|---|
| Iron | 1.58 | 0.34 | 21.5 |
| Potassium | 6.34 | 0.006 | 0.08 |
| Calcium | | 0.02 | |
| Magnesium | | 0.025 | |

In this experiment, hydrochloric acid was used as the additive. 5 ml of 1M acid was used to yield an amount of elemental chlorine equivalent to that contained in 0.01 mole (g) of ferrous chloride.

As to the mercury-removal results of this experiment, 93.0% of the mercuric sulfide was removed from Sample (a) (standard sand plus hydrochloric acid additive), and 36.0% was removed from Sample (b) (de-ironized sand plus hydrochloric acid additive). That is, only about onethird as much mercuric sulfide was removed from de-ironized sand as from standard sand.

This can be attributed to the fact that. hydrochloric acid added to sand yields a mixture of chlorine from the acid and iron from the sand. Therefore, the addition of hydrochloric acid to promote volatilization of mercury simulates the same state in sand as the addition of ferrous chloride. Since the amount of iron in the deironized sand has been reduced, the proportion of mercuric sulfide removed has decreased.

EXAMPLE 5

Heat treatment experiments with variable amounts of sand (Experiment 4)

In Experiment 4, the amount of ferrous chloride additive and mercuric sulfide (23 mg (20 mg as Hg)) was kept constant while the amount of standard sand was changed in four stages from 1,000-fold to 5,000-fold.

The standard sand was from Toyoura, for which X-ray analysis showed silica to be the predominant component, and the particle size was uniform with a mean particle diameter of 0.18 mm and mean coefficient of 1.5.

Figure 3:
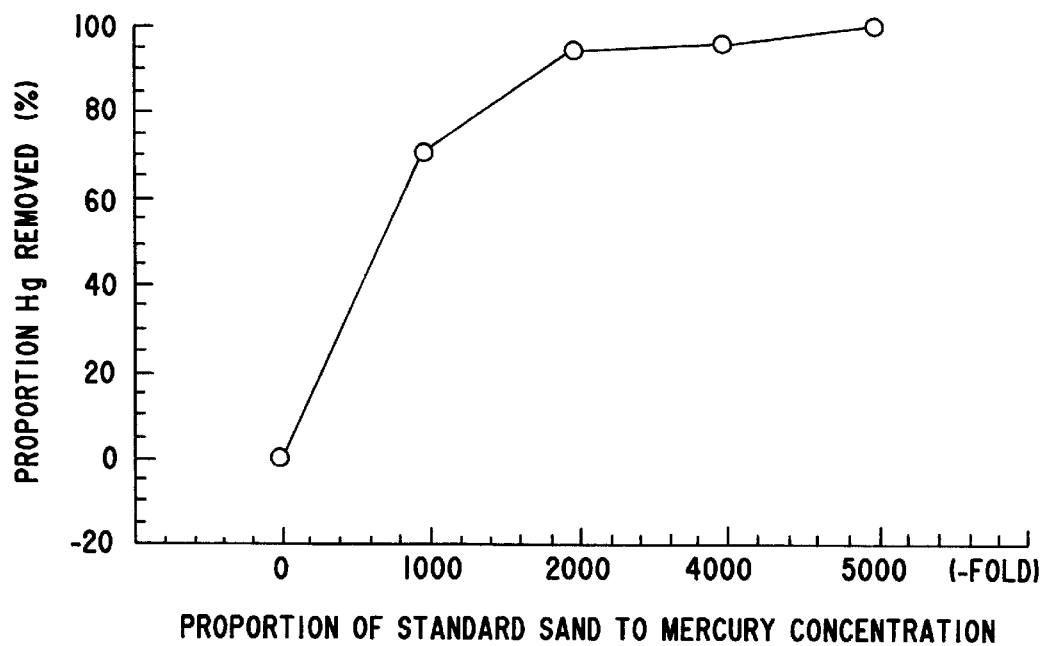
FIG. 3 illustrates the percentage of mercury removal versus the proportion of standard sand relative to the mercury concentration.

The percentage removal of mercury from variable amounts of standard sand relative to mercury content are shown in FIG. 3. Results indicate that a 2,000-fold ratio of sand to mercury was required for a removal in excess of 90%.

EXAMPLE 6

Heat treatment experiments with variable amounts oaf additive (Experiment 5)

Figure 4:
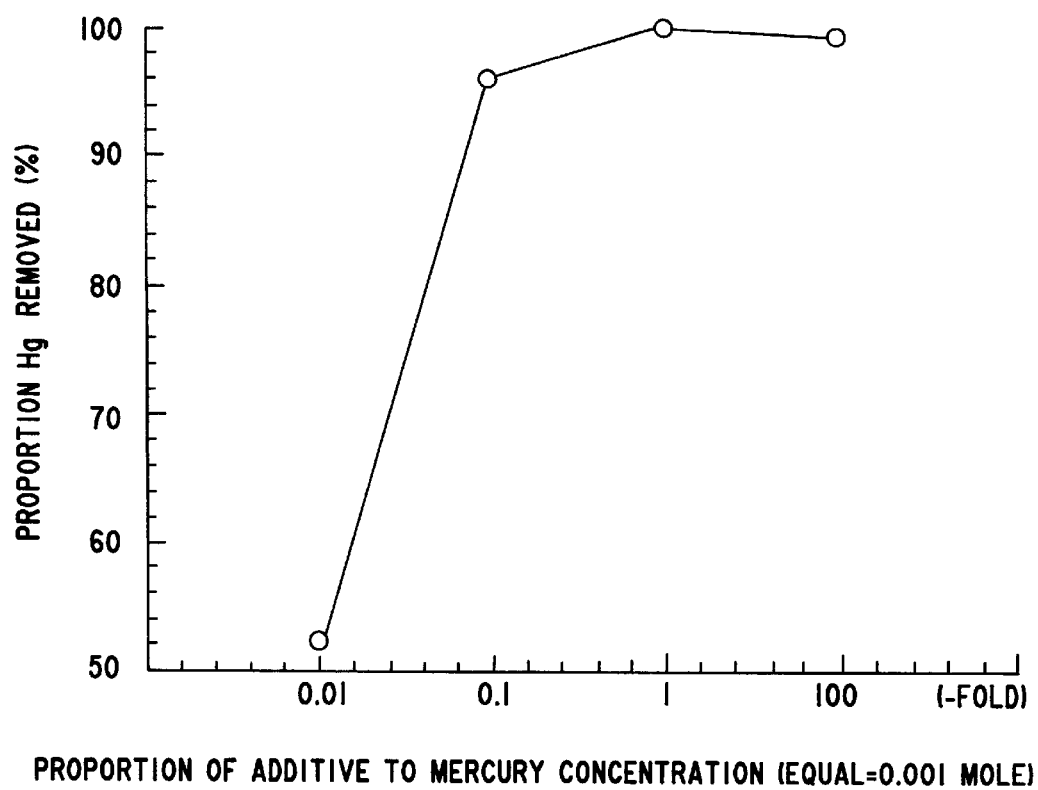
FIG. 4 illustrates the percentage of mercury removal versus the proportion of additive relative to the mercury concentration.

In Experiment 5, the amount of standard sand and mercuric sulfide concentration were kept constant, while the amount of ferrous chloride additive was varied in four stages from 100-times, equal, one-tenth, and one-one-hundredth of the mole concentration of mercury. Removal ratios are shown in FIG. 4. These results show that 99.5% or greater of the mercury could be removed by adding ferrous chloride additive in amounts at least equal to the mole concentration of mercury, then heating at 200° C. for 2 hours. At lower concentrations, the percentage removed decreased, for a maximum of about 50% removal at an additive concentration of 1% of the mole concentration of mercury.

Next, the heat-treatment removal of mercuric sulfide from loam soil and Minamata Bay sludge is explained.

EXAMPLE 7

Loam soil and Minamata Bay sludge (Experiment 6)

In Experiment 6, mercuric sulfide was added to loam soil in an amount to produce a final concentration of 20 mg of mercury per 10 g of soil. The concentration of mercury in Minamata Bay sludge was measured as 0.45 mg/5 g of sludge. The amount of ferrous chloride additive was set at 0.01 mole.

Results of Experiment 6 are shown in Table 4. The effectiveness of the additive for loam and Minamata sludge were similar to that of standard sand.

TABLE 4

|  | Initial Value mg | After Heating mg | Removal % |
|---|---|---|---|
| Loam | 18.5 | 14.0 | 22.2 |
| Sludge | 0.45 | 0.40 | 11.5 |

EXAMPLE 8

Addition of standard sand (Experiment 7 and Experiment 8)

Figure 5:
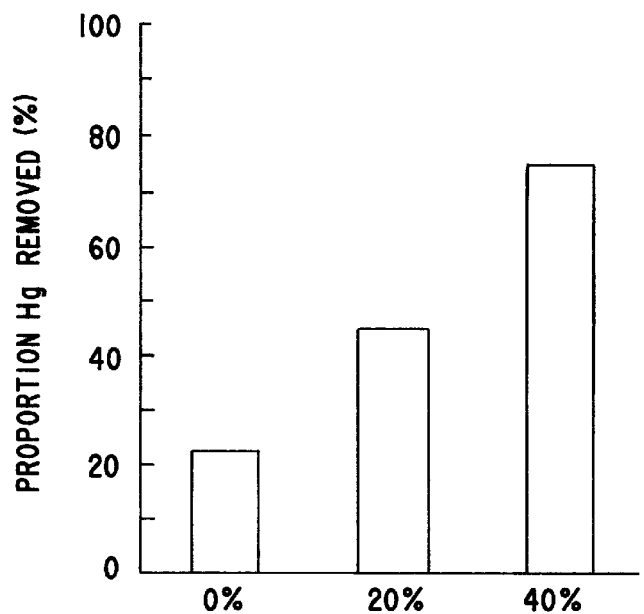
FIG. 5 illustrates the percentage of mercury removal versus the proportion of standard sand added to loam and sludge.

In Experiment 7, the amount of ferrous chloride added to loam and Minamata sludge was increased, and standard sand was also added. The amount of ferrous chloride was set at 0.02 mole, and the amount of standard sand relative to loam was varied from 0% to 20% to 40%, and relative to sludge was varied from 0% to 50% Results are shown in FIG. 5. The results indicate that the removal of mercuric sulfide increased proportionally to an increase in the amount of standard sand.

Figure 6:
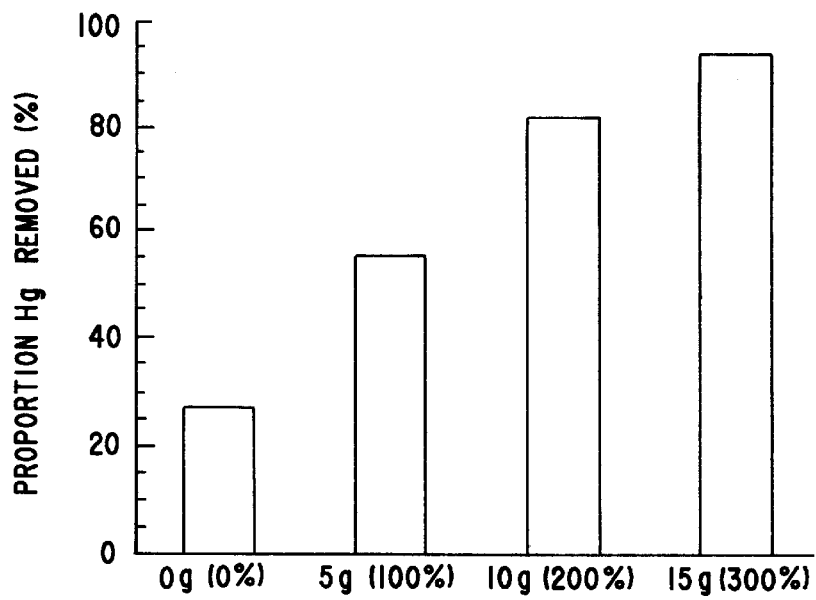
FIG. 6 illustrates the percentage of mercury removal versus the proportion of standard sand added to sludge.

In Experiment 8, Toyoura sand was added to Minamata sludge for which the removal ratios are shown in FIG. 6. Here, 0.01 mole (1.268 g) of ferrous chloride was used. Results are shown in FIG. 6. As with Experiment 7, the removal of mercuric sulfide increased proportionally to an increase in the amount of standard sand.

EXAMPLE 9

Addition of standard sand (Experiment 9)

Figure 7:
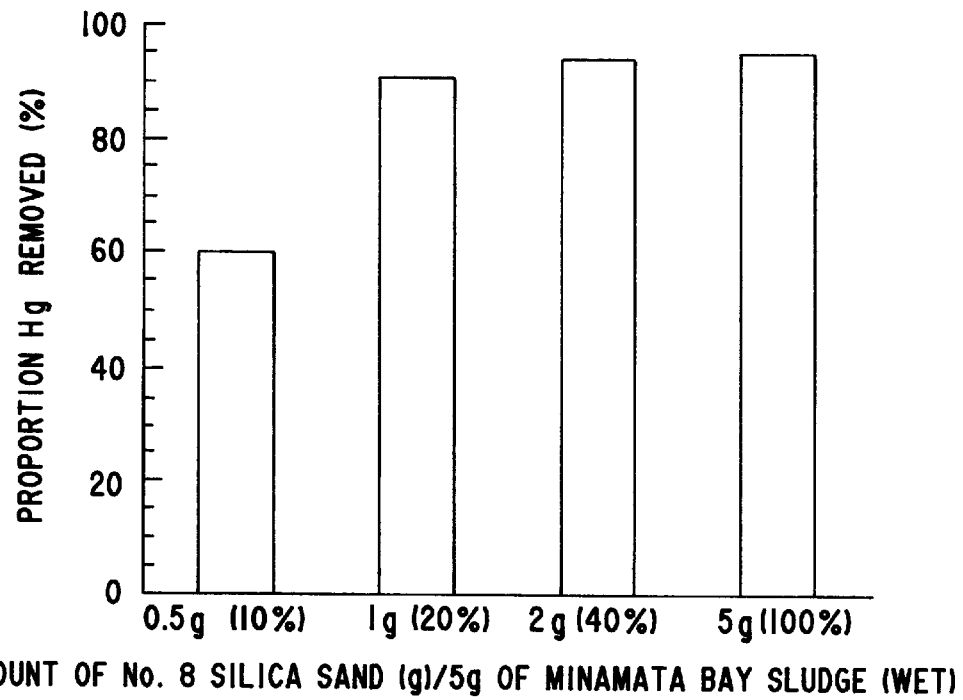
FIG. 7 illustrates the percentage of mercury removal versus the proportion of silica sand relative to the mercury concentration.

In Experiment 9, No. 8 silica sand, which has a higher concentration of quartz than standard sand, and is of fine particle diameter, was mixed with Minamata sludge. No. 8 silica sand is comprised of 97–99% quartz. It has a particle diameter of 0.05–0.1 mm (compared to 0.1–0.3 mm for standard sand), with a resultant 10-fold greater surface area than standard sand. Experimental data is shown in FIG. 7. Results indicate that a mercury removal ratio of 95% was achieved using only 1/10th the amount of silica sand as of standard sand. In other words, vaporization is accelerated in proportion to the reaction area.

Next, the removal of mercury with silica materials is discussed.

EXAMPLE 10

Addition of silica minerals (Experiment 10)

Figure 8:
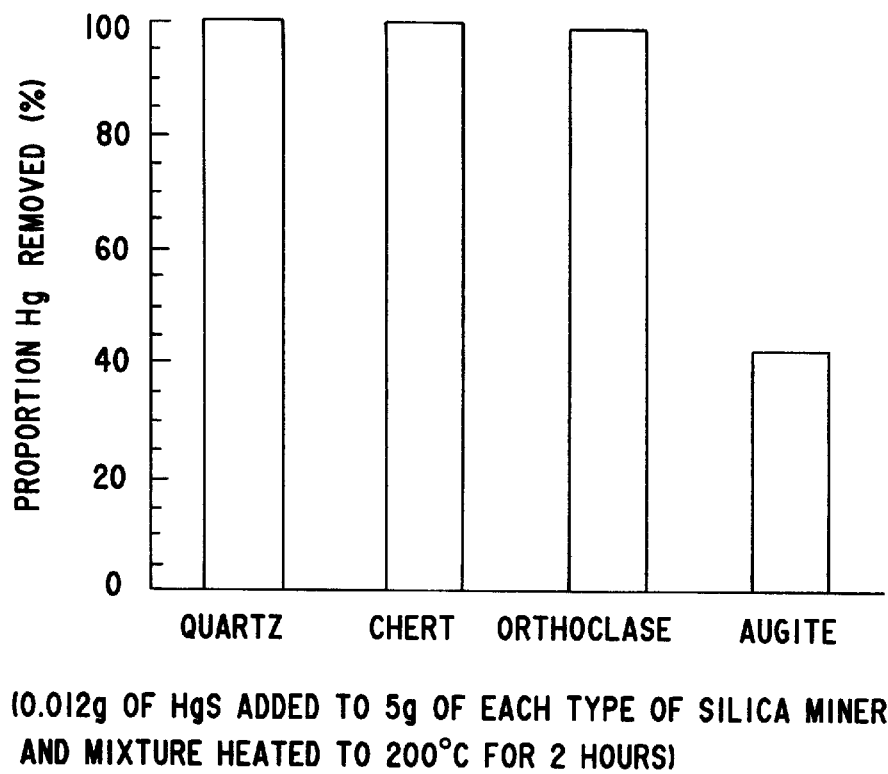
FIG. 8 illustrates the mercury removal ratio by type of silica mineral.

In Experiment 10, the heating and vaporization reaction was conducted on different types of silica minerals, wherein 0.012 g of mercuric sulfide was added to a 5 g sample of each of quartz, chert, orthoclase, and augite. Each mixture was heated at 200° C. for 2 hours. Results are shown in FIG. 8.

Quartz, chert, and orthoclase were each extremely efficient in removing mercury.

The scope of the present invention is to be determined in light of the following claims.

We claim:

1. A method of removing one or more mercury compounds from mercury-contaminated soil, comprising:
   mixing the mercury-contaminated soil with an additive selective from the group consisting of a transition metal, zinc and aluminum, or a compound thereof, to produce a soil/additive mixture;
   heating the soil/additive mixture to a temperature which is below the boiling point of the one or more mercury compounds; and
   thereafter recovering the one or more mercury compounds.

2. The method of claim 1, wherein the soil/additive mixture is heated to a temperature in a range of 200°–300° C.

3. The method of claim 1, wherein the transition metal is selected from the group consisting of iron, nickel and manganese.

4. The method of claim 1, wherein the compound is a chloride compound.

5. The method of claim 1, wherein the additive is a chloride compound of iron or nickel.

6. The method of claim 5, wherein the additive is $FeCl_2$, $FeCl_3$ or $NiCl_2$.

7. The method of claim 1, wherein the soil/additive mixture is heated for about two hours.

8. The method of claim 1, further comprising mixing a silica source with the mercury-contaminated soil and the additive in said mixing step.

9. The method of claim 8, wherein the silica source is selected from the group consisting of sand, silica sand and crystalline silica.

10. The method of claim 8, wherein the silica source is crystalline silica.

11. The method of claim 10, wherein the crystalline silica is selected from the group consisting of quartz, chert and orthoclase.

12. The method of claim 1, wherein the heating step is conducted at a partial pressure to promote evaporation of the one or more mercury compounds into mercury vapor.

13. The method of claim 12, wherein the heating step is conducted at a pressure of 740–720 mm Hg.

* * * * *